United States Patent
Onishi et al.

(10) Patent No.: US 12,135,307 B2
(45) Date of Patent: Nov. 5, 2024

(54) SENSOR ELEMENT OF GAS SENSOR (71) Applicant: NGK INSULATORS, LTD., Nagoya (JP)

(72) Inventors: Ryo Onishi, Iwakura (JP); Yusuke Watanabe, Nagoya (JP); Takashi Hino, Kasugai (JP)

(73) Assignee: NGK INSULATORS, LTD., Nagoya (JP)

( * ) Notice: Subject to any disclaimer, the term of this patent is extended or adjusted under 35 U.S.C. 154(b) by 566 days.

(21) Appl. No.: 17/460,752

(22) Filed: Aug. 30, 2021

(65) Prior Publication Data
US 2021/0389268 A1 Dec. 16, 2021

Related U.S. Application Data (63) Continuation of application No. PCT/JP2020/009602, filed on Mar. 6, 2020.

(30) Foreign Application Priority Data

Mar. 29, 2019 (JP) .................. 2019-066768

(51) Int. Cl.
*G01N 27/407* (2006.01)
*G01N 27/41* (2006.01)
(52) U.S. Cl.
CPC ..... *G01N 27/4077* (2013.01); *G01N 27/4072* (2013.01); *G01N 27/41* (2013.01)
(58) Field of Classification Search
CPC .............. G01N 27/4077; G01N 27/4072
See application file for complete search history.

(56) References Cited

U.S. PATENT DOCUMENTS

| | | | |
|---|---|---|---|
| 9,000,758 B2 | 4/2015 | Iwahashi | |
| 9,915,637 B2 | 3/2018 | Sekiya et al. | |
| 2011/0186431 A1 | 8/2011 | Horisaka et al. | |
| 2013/0104625 A1 | 5/2013 | Otsuka et al. | |

(Continued)

FOREIGN PATENT DOCUMENTS

| | | | |
|---|---|---|---|
| JP | 2011-158390 A | 8/2011 | |
| JP | 2013-096792 A | 5/2013 | |

(Continued)

OTHER PUBLICATIONS

English language translation of International Preliminary Report on Patentability received in corresponding International Application No. PCT/JP2020/009602 dated Oct. 4, 2021 (Year: 2021).*

(Continued)

*Primary Examiner* — Alexander S Noguerola
(74) *Attorney, Agent, or Firm* — MATTINGLY & MALUR, PC (57) ABSTRACT

A sensor element includes: an element base including a gas distribution part communicating from a gas inlet; and a leading-end protective layer including an inner layer covering an end portion and four side surfaces of the element base and an outer layer covering the inner layer and having a lower porosity than the inner layer, and a total thickness representative value, defined as an average of total thicknesses of the protective layer at a plurality of positions including a starting point, an intermediate position, and an innermost end of the gas distribution part, is 250 μm or more, and a film thickness variation degree, defined as a ratio of a difference between a maximum value and a minimum value of the total thicknesses with respect to the total thickness representative value when the value is based at 100, is 20 or less.

2 Claims, 3 Drawing Sheets

(56) References Cited

U.S. PATENT DOCUMENTS

| | | | |
|---|---|---|---|
| 2015/0075254 A1 | 3/2015 | Sakuma et al. | |
| 2015/0276661 A1 | 10/2015 | Moriyama et al. | |
| 2017/0284958 A1* | 10/2017 | Watanabe | G01N 27/4074 |
| 2018/0284055 A1 | 10/2018 | Hino | |
| 2020/0072784 A1 | 3/2020 | Watanabe et al. | |

FOREIGN PATENT DOCUMENTS

| | | |
|---|---|---|
| JP | 5344375 B2 | 11/2013 |
| JP | 2015-59758 A | 3/2015 |
| JP | 2016-065851 A | 4/2016 |
| JP | 2016-065853 A | 4/2016 |
| JP | 5997833 B2 | 9/2016 |
| JP | 2018-169324 A | 11/2018 |
| JP | 2020-034443 A | 3/2020 |

OTHER PUBLICATIONS

English language translation of 13. The Chinese Office Action received in corresponding Chinese Application No. 20280017317.X mailed Oct. 18, 2023 (Year: 2023).*

Chinese Office Action received in corresponding Chinese Application No. 202080017317.X mailed Oct. 18, 2023.

Unexamined U.S. Appl. No. 17/460,763, filed Aug. 30, 2021.
Jnexamined U.S. Appl. No. 17/460,770, filed Aug. 30, 2021.
Unexamined U.S. Appl. No. 17/460,780, filed Aug. 30, 2021.
International Search Report of PCT/JP2020/009602 dated Jun. 9, 2020.

International Preliminary Report on Patentability received in corresponding International Application No. PCT/JP2020/009602 dated Oct. 14, 2021.

* cited by examiner

SENSOR ELEMENT OF GAS SENSOR

CROSS-REFERENCE TO RELATED APPLICATION

This application is a continuation application of PCT/JP2020/009602, filed on Mar. 6, 2020, which claims the benefit of priority of Japanese Patent Application No. 2019-066768, filed on Mar. 29, 2019, the entire contents of which are incorporated herein by reference.

BACKGROUND OF THE INVENTION

Field of the Invention

The present invention relates to a sensor element of a gas sensor and, in particular, to a surface protective layer thereof.

Description of the Background Art

As a gas sensor for determining concentration of a desired gas component contained in a measurement gas, such as an exhaust gas from an internal combustion engine, a gas sensor that includes a sensor element made of an oxygen-ion conductive solid electrolyte, such as zirconia ($ZrO_2$), and including some electrodes on the surface and the inside thereof has been widely known. As the sensor element, a sensor element having an elongated planar shape and including a protective layer formed of a porous body (porous protective layer) in an end portion in which a part for introducing the measurement gas is provided has been known (see Japanese Patent No. 5344375, for example).

The protective layer is provided to the surface of the sensor element to secure water resistance of the sensor element when the gas sensor is in use. Specifically, the protective layer is provided to prevent water-induced cracking of the sensor element under the action of thermal shock caused by heat (cold) from water droplets adhering to the surface of the sensor element.

As one method for conducting a water resistance test on the sensor element, a method of attaching a gas sensor incorporating the sensor element to an exhaust pipe of a test device (water amount measuring device) imitating an actual vehicle, and evaluating water resistance of the sensor element from whether water-induced cracking has occurred when a test gas containing water is allowed to flow into the exhaust pipe on a predetermined condition has already been known (see Japanese Patent No. 5997833, for example).

Adherence of water droplets to the surface of the sensor element is a phenomenon that could occur locally, so that, when uniformity of the thickness is insufficient, water-induced cracking is likely to occur upon adherence of water droplets to a portion having a small thickness to cause thermal shock in the portion, even if the protective layer has an average thickness (film thickness) sufficient to suppress water-induced cracking.

SUMMARY

The present invention relates to a sensor element of a gas sensor and, in particular, to a surface protective layer thereof.

According to the present invention, a sensor element of a gas sensor includes: an element base being a ceramic structure having a gas inlet in one end portion thereof and including therein a gas distribution part communicating from the gas inlet in a longitudinal direction, a measurement gas containing a gas component to be measured being introduced into the gas distribution part through the gas inlet, the gas component to be measured being sensed by a sensing part disposed in the gas distribution part; and a leading-end protective layer being a porous layer disposed around an outer periphery of the element base in a predetermined range from the one end portion. The leading-end protective layer includes: an inner leading-end protective layer disposed to cover the end portion and four side surfaces of the element base contiguous with the end portion; and an outer leading-end protective layer disposed to cover the inner leading-end protective layer, and having a lower porosity than the inner leading-end protective layer, and a total thickness representative value is 250 μm or more, and a film thickness variation degree is 20 or less, where the total thickness representative value is defined as an average value of total thicknesses of the leading-end protective layer at a plurality of thickness evaluation positions, the plurality of thickness evaluation positions including at least: a first position as a position of a starting point of the gas distribution part where the gas inlet is disposed; a second position as an intermediate position of the gas distribution part; and a third position as a position of an innermost end of the gas distribution part from the gas inlet, and the film thickness variation degree is defined as a ratio of a difference between a maximum value and a minimum value of the total thicknesses of the leading-end protective layer at the plurality of thickness evaluation positions with respect to the total thickness representative value when the value is based at 100.

According to the present invention, the sensor element including the leading-end protective layer uniformly having excellent thermal shock resistance to thereby suitably secure water resistance is achieved.

It is therefore an object to provide a sensor element of a gas sensor in which the occurrence of water-induced cracking is more surely suppressed by securing uniformity of thermal shock resistance of a protective layer.

DESCRIPTION OF THE PREFERRED EMBODIMENTS

<Overview of Sensor Element and Gas Sensor>

Figure 1:
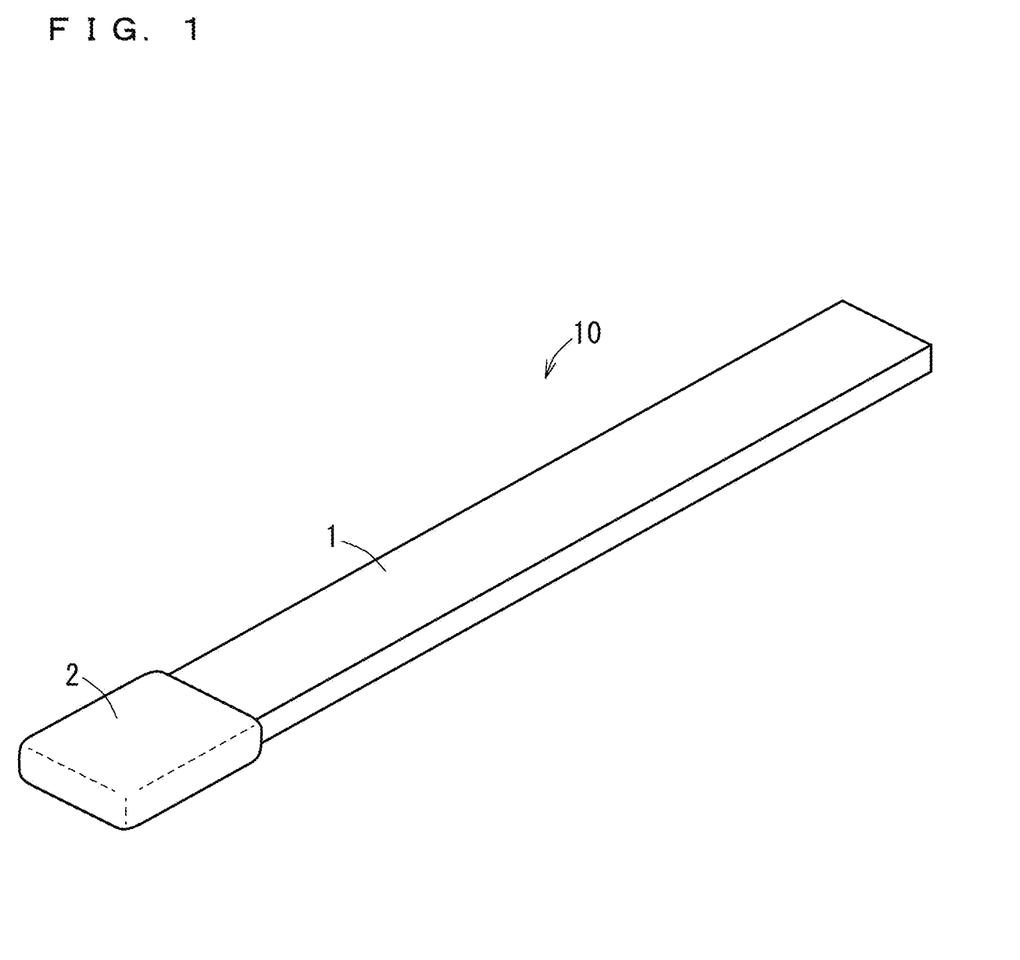
FIG. 1 is a schematic external perspective view of a sensor element 10.
Figure 2:
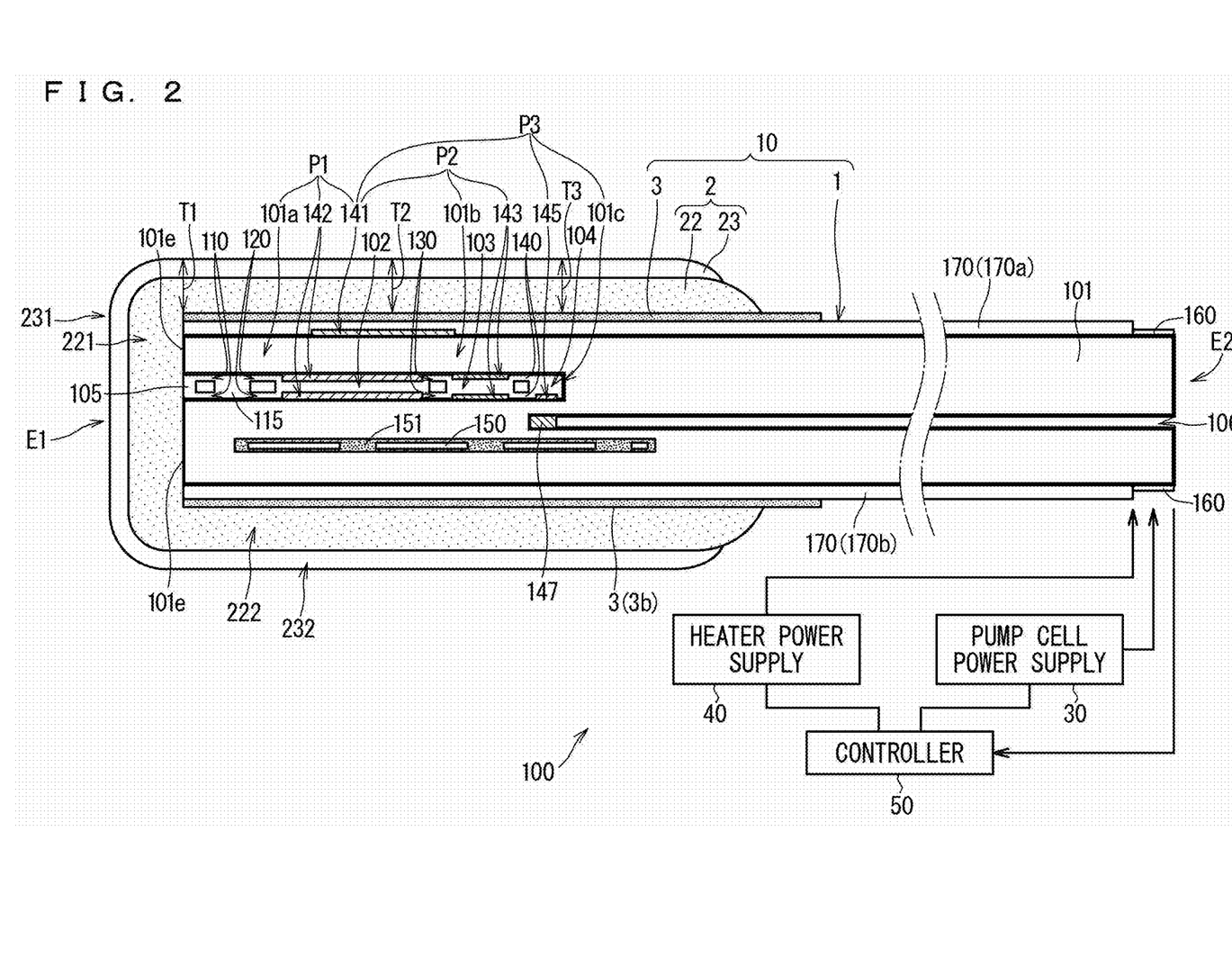
FIG. 2 is a schematic view illustrating a configuration of a gas sensor 100 including a sectional view taken along a longitudinal direction of the sensor element 10.

FIG. 1 is a schematic external perspective view of a sensor element (gas sensor element) 10 according to an embodiment of the present invention. FIG. 2 is a schematic view illustrating a configuration of a gas sensor 100 including a sectional view taken along a longitudinal direction of the sensor element 10. The sensor element 10 is a ceramic structure as a main component of the gas sensor 100 sensing a predetermined gas component in a measurement gas, and measuring concentration thereof. The sensor element 10 is a so-called limiting current gas sensor element.

In addition to the sensor element 10, the gas sensor 100 mainly includes a pump cell power supply 30, a heater power supply 40, and a controller 50.

As illustrated in FIG. 1, the sensor element 10 has a configuration in which one end portion of an elongated planar element base 1 is covered with a porous leading-end protective layer 2.

As illustrated in FIG. 2, the element base 1 includes an elongated planar ceramic body 101 as a main structure, main surface protective layers 170 are provided on two main surfaces of the ceramic body 101, and, in the sensor element 10, the leading-end protective layer 2 is further provided outside both an end surface (a leading end surface 101e of the ceramic body 101) and four side surfaces in one leading end portion. The four side surfaces other than opposite end surfaces in the longitudinal direction of the sensor element 10 (or the element base 1, or the ceramic body 101) are hereinafter simply referred to as side surfaces of the sensor element 10 (or the element base 1, or the ceramic body 101).

The ceramic body 101 is made of ceramic containing, as a main component, zirconia (yttrium stabilized zirconia), which is an oxygen-ion conductive solid electrolyte. Various components of the sensor element 10 are provided outside and inside the ceramic body 101. The ceramic body 101 having the configuration is dense and airtight. The configuration of the sensor element 10 illustrated in FIG. 2 is just an example, and a specific configuration of the sensor element 10 is not limited to this configuration.

The sensor element 10 illustrated in FIG. 2 is a so-called serial three-chamber structure type gas sensor element including a first internal chamber 102, a second internal chamber 103, and a third internal chamber 104 inside the ceramic body 101. That is to say, in the sensor element 10, the first internal chamber 102 communicates, through a first diffusion control part 110 and a second diffusion control part 120, with a gas inlet 105 opening to the outside on a side of one end portion E1 of the ceramic body 101 (to be precise, communicating with the outside through the leading-end protective layer 2), the second internal chamber 103 communicates with the first internal chamber 102 through a third diffusion control part 130, and the third internal chamber 104 communicates with the second internal chamber 103 through a fourth diffusion control part 140. A path from the gas inlet 105 to the third internal chamber 104 is also referred to as a gas distribution part. In the sensor element 10 according to the present embodiment, the gas distribution part is provided straight along the longitudinal direction of the ceramic body 101.

The first diffusion control part 110, the second diffusion control part 120, the third diffusion control part 130, and the fourth diffusion control part 140 are each provided as two slits vertically arranged in FIG. 2. The first diffusion control part 110, the second diffusion control part 120, the third diffusion control part 130, and the fourth diffusion control part 140 provide predetermined diffusion resistance to a measurement gas passing therethrough. A buffer space 115 having an effect of buffering pulsation of the measurement gas is provided between the first diffusion control part 110 and the second diffusion control part 120.

An outer pump electrode 141 is provided on an outer surface of the ceramic body 101, and an inner pump electrode 142 is provided in the first internal chamber 102. Furthermore, an auxiliary pump electrode 143 is provided in the second internal chamber 103, and a measurement electrode 145 as a sensing part to directly sense a gas component to be measured is provided in the third internal chamber 104. In addition, a reference gas inlet 106 which communicates with the outside and through which a reference gas is introduced is provided on a side of the other end portion E2 of the ceramic body 101, and a reference electrode 147 is provided in the reference gas inlet 106.

In a case where a target of measurement of the sensor element 10 is NOx in the measurement gas, for example, concentration of a NOx gas in the measurement gas is calculated by a process as described below.

First, the measurement gas introduced into the first internal chamber 102 is adjusted to have a substantially constant oxygen concentration by a pumping action (pumping in or out of oxygen) of a main pump cell P1, and then introduced into the second internal chamber 103. The main pump cell P1 is an electrochemical pump cell including the outer pump electrode 141, the inner pump electrode 142, and a ceramic layer 101a that is a portion of the ceramic body 101 existing between these electrodes. In the second internal chamber 103, oxygen in the measurement gas is pumped out of the element by a pumping action of an auxiliary pump cell P2, which is also an electrochemical pump cell, so that the measurement gas is at a sufficiently low oxygen partial pressure. The auxiliary pump cell P2 includes the outer pump electrode 141, the auxiliary pump electrode 143, and a ceramic layer 101b that is a portion of the ceramic body 101 existing between these electrodes.

The outer pump electrode 141, the inner pump electrode 142, and the auxiliary pump electrode 143 are each formed as a porous cermet electrode (e.g., a cermet electrode made of $ZrO_2$ and Pt that contains Au of 1%). The inner pump electrode 142 and the auxiliary pump electrode 143 to be in contact with the measurement gas are each formed using a material having weakened or no reducing ability with respect to a NOx component in the measurement gas.

NOx in the measurement gas caused by the auxiliary pump cell P2 to be at a low oxygen partial pressure is introduced into the third internal chamber 104, and reduced or decomposed by the measurement electrode 145 provided in the third internal chamber 104. The measurement electrode 145 is a porous cermet electrode also functioning as a NOx reduction catalyst that reduces NOx existing in an atmosphere in the third internal chamber 104. During the reduction or decomposition, a potential difference between the measurement electrode 145 and the reference electrode 147 is maintained constant. Oxygen ions generated by the above-mentioned reduction or decomposition are pumped out of the element by a measurement pump cell P3. The measurement pump cell P3 includes the outer pump electrode 141, the measurement electrode 145, and a ceramic layer 101c that is a portion of the ceramic body 101 existing between these electrodes. The measurement pump cell P3 is an electrochemical pump cell pumping out oxygen generated by decomposition of NOx in an atmosphere around the measurement electrode 145.

Pumping (pumping in or out of oxygen) of the main pump cell P1, the auxiliary pump cell P2, and the measurement pump cell P3 is achieved, under control performed by the controller 50, by the pump cell power supply (variable power supply) 30 applying a voltage necessary for pumping across electrodes included in each of the pump cells. In a case of the measurement pump cell P3, a voltage is applied across the outer pump electrode 141 and the measurement electrode 145 so that the potential difference between the measurement electrode 145 and the reference electrode 147 is maintained at a predetermined value. The pump cell power supply 30 is typically provided for each pump cell.

The controller 50 detects a pump current Ip2 flowing between the measurement electrode 145 and the outer pump electrode 141 in accordance with the amount of oxygen pumped out by the measurement pump cell P3, and calculates a NOx concentration in the measurement gas based on a linear relationship between a current value (NOx signal) of the pump current Ip2 and the concentration of decomposed NOx.

The gas sensor 100 preferably includes a plurality of electrochemical sensor cells, which are not illustrated, sensing the potential difference between each pump electrode and the reference electrode 147, and each pump cell is controlled by the controller 50 based on a signal detected by each sensor cell.

In the sensor element 10, a heater 150 is buried in the ceramic body 101. The heater 150 is provided, below the gas distribution part in FIG. 2, over a range from the vicinity of the one end portion E1 at least to a position of formation of the measurement electrode 145 and the reference electrode 147. The heater 150 is provided mainly to heat the sensor element 10 to enhance oxygen-ion conductivity of the solid electrolyte forming the ceramic body 101 when the sensor element 10 is in use. More particularly, the heater 150 is provided to be surrounded by an insulating layer 151.

The heater 150 is a resistance heating body made, for example, of platinum. The heater 150 generates heat by being powered from the heater power supply 40 under control performed by the controller 50.

The sensor element 10 according to the present embodiment is heated by the heater 150 when being in use so that the temperature at least in a range from the first internal chamber 102 to the second internal chamber 103 is at or above 500° C. In some cases, the sensor element 10 is heated so that the temperature of the gas distribution part as a whole from the gas inlet 105 to the third internal chamber 104 is at or above 500° C. These are to enhance the oxygen-ion conductivity of the solid electrolyte forming each pump cell and to desirably demonstrate the ability of each pump cell. In this case, the temperature in the vicinity of the first internal chamber 102, which is at the highest temperature, is approximately at 700° C. to 800° C.

In the following description, from among the two main surfaces of the ceramic body 101, a main surface (or an outer surface of the sensor element 10 having the main surface) which is located on an upper side in FIG. 2 and on a side where the main pump cell P1, the auxiliary pump cell P2, and the measurement pump cell P3 are mainly provided is also referred to as a pump surface, and a main surface (or an outer surface of the sensor element 10 having the main surface) which is located on a lower side in FIG. 2 and on a side where the heater 150 is provided is also referred to as a heater surface. In other words, the pump surface is a main surface closer to the gas inlet 105, the three internal chambers, and the pump cells than to the heater 150, and the heater surface is a main surface closer to the heater 150 than to the gas inlet 105, the three internal chambers, and the pump cells.

A plurality of electrode terminals 160 are formed on the respective main surfaces of the ceramic body 101 on the side of the other end portion E2 to establish electrical connection between the sensor element 10 and the outside. These electrode terminals 160 are electrically connected to the above-mentioned five electrodes, opposite ends of the heater 150, and a lead for detecting heater resistance, which is not illustrated, through leads provided inside the ceramic body 101, which are not illustrated, to have a predetermined correspondence relationship. Application of a voltage from the pump cell power supply 30 to each pump cell of the sensor element 10 and heating by the heater 150 by being powered from the heater power supply 40 are thus performed through the electrode terminals 160.

The sensor element 10 further includes the above-mentioned main surface protective layers 170 (170a and 170b) on the pump surface and the heater surface of the ceramic body 101. The main surface protective layers 170 are layers made of alumina, having a thickness of approximately 5 μm to 30 μm, and including pores with a porosity of approximately 20% to 40%, and are provided to prevent adherence of any foreign matter and poisoning substances to the main surfaces (the pump surface and the heater surface) of the ceramic body 101 and the outer pump electrode 141 provided on the pump surface. The main surface protective layer 170a on the pump surface thus functions as a pump electrode protective layer for protecting the outer pump electrode 141.

In the present embodiment, the porosity is obtained by applying a known image processing method (e.g., binarization processing) to a scanning electron microscope (SEM) image of an evaluation target.

The main surface protective layers 170 are provided over substantially all of the pump surface and the heater surface except that the electrode terminals 160 are partially exposed in FIG. 2, but this is just an example. The main surface protective layers 170 may locally be provided in the vicinity of the outer pump electrode 141 on the side of the one end portion E1 compared with the case illustrated in FIG. 2.

<Details of Leading-End Protective Layer>

In the sensor element 10, the leading-end protective layer 2 is provided around an outermost periphery of the element base 1 having a configuration as described above in a predetermined range from the one end portion E1.

The leading-end protective layer 2 is provided in a manner of surrounding a portion of the element base 1 in which the temperature is high (up to approximately 700° C. to 800° C.) when the gas sensor 100 is in use, in order to secure water resistance in the portion to thereby suppress the occurrence of cracking (water-induced cracking) of the element base 1 due to thermal shock caused by local temperature reduction upon direct exposure of the portion to water.

In addition, the leading-end protective layer 2 is provided to secure poisoning resistance to prevent poisoning substances, such as Mg, from entering into the sensor element 10.

As illustrated in FIG. 2, in the sensor element 10 according to the present embodiment, the leading-end protective layer 2 includes two layers: an inner leading-end protective layer 22 and an outer leading-end protective layer 23. An underlying layer 3 is provided between the leading-end protective layer 2 (inner leading-end protective layer 22) and the element base 1.

The underlying layer 3 is a layer provided to secure bonding (adhesion) of the inner leading-end protective layer 22 formed thereon (further the outer leading-end protective layer 23). The underlying layer 3 is provided at least on two main surfaces of the element base 1 on a side of the pump surface and a side of the heater surface. That is to say, the underlying layer 3 includes an underlying layer 3a on the side of the pump surface and an underlying layer 3b on the side of the heater surface. The underlying layer 3, however, is not provided on a side of the leading end surface 101e of the ceramic body 101 (of the element base 1).

The underlying layer 3 is made of alumina, has a porosity of 30% to 60%, and has a thickness of 15 μm to 50 μm. In contrast to the inner leading-end protective layer 22 and the outer leading-end protective layer 23, the underlying layer 3 is formed along with the element base 1 in a process of manufacturing the element base 1 as described below.

The inner leading-end protective layer 22 and the outer leading-end protective layer 23 are provided in this order from inside to cover the leading end surface 101e and the four side surfaces on the side of the one end portion E1 of the element base 1 (around an outer periphery of the element base 1 on the side of the one end portion E1). A portion of the inner leading-end protective layer 22 on the side of the leading end surface 101e is particularly referred to as a leading-end portion 221, and a portion of the inner leading-end protective layer 22 on the side of the pump surface and the side of the heater surface is particularly referred to as a main surface portion 222. Similarly, a portion of the outer leading-end protective layer 23 on the side of the leading end surface 101e is particularly referred to as a leading-end portion 231, and a portion of the outer leading-end protective layer 23 on the side of the pump surface and the side of the heater surface is particularly referred to as a main surface portion 232. The main surface portion 222 of the inner leading-end protective layer 22 is adjacent to the underlying layer 3.

The inner leading-end protective layer 22 is made of alumina, has a porosity of 40% to 80%, and has a thickness of 300 μm to 800 μm. The outer leading-end protective layer 23 is made of alumina, has a porosity of 10% to 40%, which is lower than that of the inner leading-end protective layer 22, and has a thickness of 50 μm to 300 μm. The leading-end protective layer 2 thereby has a configuration in which the inner leading-end protective layer 22 having lower thermal conductivity than the outer leading-end protective layer 23 is covered with the outer leading-end protective layer 23 having a lower porosity than the inner leading-end protective layer 22. The inner leading-end protective layer 22 is provided as a layer having low thermal conductivity to have a function to suppress heat conduction from the outside to the element base 1.

The inner leading-end protective layer 22 and the outer leading-end protective layer 23 are formed by sequentially thermal spraying (plasma-spraying) materials for them with respect to the element base 1 having a surface on which the underlying layer 3 has been formed. This is to develop an anchoring effect between the inner leading-end protective layer 22 and the underlying layer 3 formed in advance in the process of manufacturing the element base 1 to thereby secure bonding (adhesion) of the inner leading-end protective layer 22 (including the outer leading-end protective layer 23 formed outside the inner leading-end protective layer 22) to the underlying layer 3. In other words, the underlying layer 3 has a function to secure bonding (adhesion) of the inner leading-end protective layer 22.

In the present embodiment, the leading-end protective layer 2 is provided so that a total thickness representative value is 250 μm or more, and a film thickness variation degree is 20 or less.

The total thickness representative value is herein defined as an average value of total thicknesses of the leading-end protective layer 2 at a plurality of different thickness evaluation positions on the pump surface or the heater surface of the leading-end protective layer 2 in a vertical cross section (cross section in a thickness direction) along the longitudinal direction of the element at the center of the sensor element 10 in a width direction. The film thickness variation degree is defined as a ratio of a difference between a maximum value and a minimum value (maximum film thickness difference) of the total thicknesses at the respective thickness evaluation positions with respect to the total thickness representative value when the value is based at 100.

The plurality of thickness evaluation positions include at least: a position (Pos. 1) of the leading end surface 101e of the ceramic body 101 as a position of a starting point of the gas distribution part where the gas inlet 105 is provided; an intermediate position (Pos. 2) of the gas distribution part; and a position (Pos. 3) of an innermost end of the third internal chamber 104 as an innermost portion of the gas distribution part (a portion farthest from the gas inlet 105). In FIG. 2, the total thicknesses of the leading-end protective layer 2 at these three positions are shown as T1, T2, and T3.

The total thicknesses of the leading-end protective layer 2 at the respective thickness evaluation positions can be obtained from a captured image of a vertical cross section (cross section in the thickness direction) along the longitudinal direction of the sensor element 10. The leading-end protective layer 2 has a total thickness of 1300 μm at most, which is the sum of a maximum value of the thickness of the inner leading-end protective layer 22 and a maximum value of the thickness of the outer leading-end protective layer 23.

The film thickness variation degree is a value indicative of uniformity of the total thickness on the pump surface or the heater surface of the leading-end protective layer 2, and the leading-end protective layer 2 can be evaluated to have a nearly uniform thickness as the value of the film thickness variation degree is small.

The thickness evaluation positions herein include at least the Pos. 1 to Pos. 3 because the Pos. 1 corresponds to a position of a boundary with a side of the leading end surface 101e of the ceramic body 101 and the Pos. 3 is closer to the end portion on the side of the other end portion E2 of the leading-end protective layer 2 so that the thickness is likely to vary at each of these positions when the leading-end protective layer 2 is formed by the above-mentioned method, while the Pos. 2 is a representative position of the leading-end protective layer 2 above the gas distribution part, and the leading-end protective layer 2 is relatively easily formed to have an intended thickness at or around the position. It is thus considered to be appropriate to take at least values measured at the Pos. 1 to Pos. 3 into account to evaluate a degree of uniformity of the thickness of the leading-end protective layer 2. As the number of thickness evaluation positions increases, a value of the film thickness variation degree naturally more suitably reflects actual uniformity of the thickness of the leading-end protective layer 2.

In the gas sensor 100 according to the present embodiment, the leading-end protective layer 2 is provided so that the total thickness representative value is 250 μm or more and the film thickness variation degree is 20 or less as described above to secure uniformity of the thickness of the leading-end protective layer 2. The leading-end protective layer 2 has uniform thickness as described above to thereby uniformly have excellent thermal shock resistance. Thermal shock caused due to adherence of water droplets to a portion of the leading-end protective layer 2 locally having a small thickness and resultant water-induced cracking of the sensor element 10 are thereby suitably suppressed. That is to say, in the gas sensor 100 according to the present embodiment, water resistance of the sensor element 10 has been improved.

The inner leading-end protective layer 22 and the outer leading-end protective layer 23 are provided not to cover the underlying layer 3 (3a and 3b) as a whole but to expose an end portion of the underlying layer 3 on a side opposite the side of the one end portion E1 in the longitudinal direction of the sensor element 10. This is to more surely secure bonding (adhesion) of the inner leading-end protective layer 22 (including the outer leading-end protective layer 23 formed outside the inner leading-end protective layer 22) to the underlying layer 3.

In addition, in the sensor element 10 shown in FIG. 2, the outer leading-end protective layer 23 is formed to expose an end portion of the inner leading-end protective layer 22 on a side opposite the side of the one end portion E1, but the outer leading-end protective layer 23 is not necessarily required to be formed in this manner. The outer leading-end protective layer 23 may be formed to cover the end portion of the inner leading-end protective layer 22.

As described above, in the sensor element 10 according to the present embodiment, the leading-end protective layer 2 has a two-layer structure including the inner leading-end protective layer 22 and the outer leading-end protective layer 23, the inner leading-end protective layer 22 with low thermal conductivity having a porosity in a range of 40% to 80% is surrounded by the outer leading-end protective layer 23 having a low porosity, and, further, the leading-end protective layer 2 is provided so that the total thickness representative value is 250 μm or more and the film thickness variation degree is 20 or less, so that the leading-end protective layer 2 uniformly has excellent thermal shock resistance. With such a configuration, water resistance has been suitably secured in the sensor element 10.

<Process of Manufacturing Sensor Element>

Figure 3:
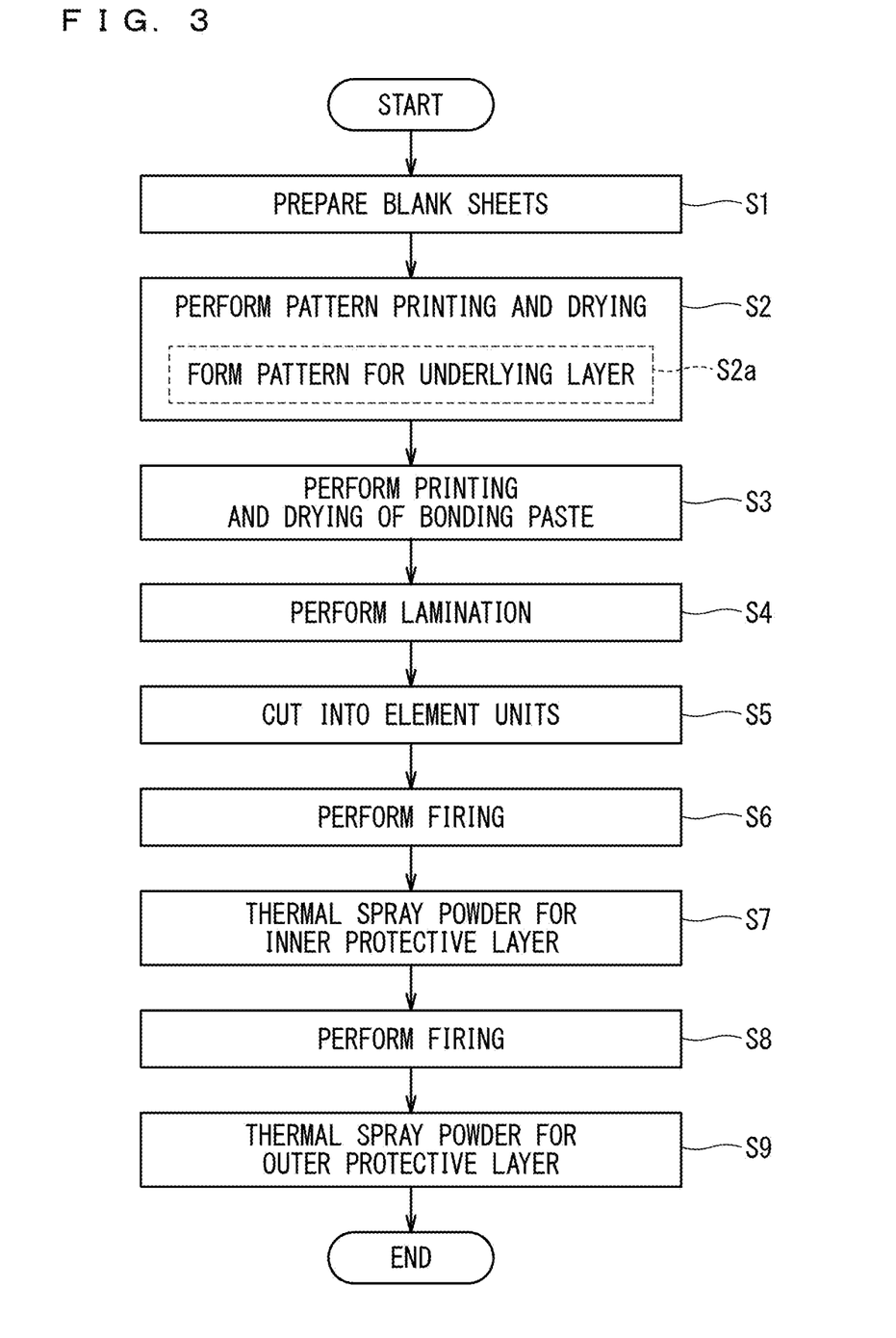
FIG. 3 is a flowchart of processing at the manufacture of the sensor element 10.

One example of a process of manufacturing the sensor element 10 having a configuration and features as described above will be described next. FIG. 3 is a flowchart of processing at the manufacture of the sensor element 10.

At the manufacture of the element base 1, a plurality of blank sheets (not illustrated) being green sheets containing the oxygen-ion conductive solid electrolyte, such as zirconia, as a ceramic component and having no pattern formed thereon are prepared first (step S1).

The blank sheets have a plurality of sheet holes used for positioning in printing and lamination. The sheet holes are formed to the blank sheets in advance prior to pattern formation through, for example, punching by a punching machine. Green sheets corresponding to a portion of the ceramic body 101 in which an internal space is formed also include penetrating portions corresponding to the internal space formed in advance through, for example, punching as described above. The blank sheets are not required to have the same thickness, and may have different thicknesses in accordance with corresponding portions of the element base 1 eventually formed.

After preparation of the blank sheets corresponding to the respective layers, pattern printing and drying are performed on the individual blank sheets (step S2). Specifically, a pattern of various electrodes, a pattern of the heater 150 and the insulating layer 151, a pattern of the electrode terminals 160, a pattern of the main surface protective layers 170, a pattern of internal wiring, which is not illustrated, and the like are formed. Application or placement of a sublimable material (vanishing material) for forming the first diffusion control part 110, the second diffusion control part 120, the third diffusion control part 130, and the fourth diffusion control part 140 is also performed at the time of pattern printing. In addition, a pattern to form the underlying layer 3 (3a and 3b) is printed onto blank sheets to become an uppermost layer and a lowermost layer after lamination (step S2a).

The patterns are printed by applying pastes for pattern formation prepared in accordance with the properties required for respective formation targets onto the blank sheets using known screen printing technology. At formation of the underlying layer 3, for example, an alumina paste that can form the underlying layer 3 having a desired porosity and thickness in the sensor element 10 eventually obtained is used. A known drying means can be used for drying after printing.

After pattern printing on each of the blank sheets, printing and drying of a bonding paste are performed to laminate and bond the green sheets (step S3). The known screen printing technology can be used for printing of the bonding paste, and the known drying means can be used for drying after printing.

The green sheets to which an adhesive has been applied are then stacked in a predetermined order, and the stacked green sheets are crimped under predetermined temperature and pressure conditions to thereby form a laminated body (step S4). Specifically, crimping is performed by stacking and holding the green sheets as a target of lamination on a predetermined lamination jig, which is not illustrated, while positioning the green sheets at the sheet holes, and then heating and pressurizing the green sheets together with the lamination jig using a lamination machine, such as a known hydraulic pressing machine. The pressure, temperature, and time for heating and pressurizing depend on a lamination machine to be used, and these conditions may be determined appropriately to achieve good lamination. The pattern to form the underlying layer 3 may be formed on the laminated body obtained in this manner.

After the laminated body is obtained as described above, the laminated body is cut out at a plurality of positions to obtain unit bodies eventually becoming the individual element bases 1 (step S5).

The unit bodies as obtained are then each fired at a firing temperature of approximately 1300° C. to 1500° C. (step S6). The element base 1 having main surfaces on which the underlying layer 3 is provided is thereby manufactured. That is to say, the element base 1 is generated by integrally firing the ceramic body 101 made of the solid electrolyte, the electrodes, and the main surface protective layers 170 along with the underlying layer 3. Integral firing is performed in this manner, so that the electrodes each have sufficient adhesion strength in the element base 1.

After the element base 1 is manufactured in the above-mentioned manner, the inner leading-end protective layer 22 and the outer leading-end protective layer 23 are formed with respect to the element base 1. The inner leading-end protective layer 22 is formed by thermal spraying powder (alumina powder) for forming the inner leading-end protective layer prepared in advance at a position of the element base 1 as a target of formation of the inner leading-end protective layer 22 to have an intended thickness (step S7), and then firing the element base 1 on which an applied film has been formed in the above manner (step S8). The alumina powder for forming the inner leading-end protective layer contains alumina powder having predetermined particle size distribution and a pore-forming material at a ratio corresponding to a desired porosity, and the pore-forming material is pyrolyzed by firing the element base 1 after thermal spraying to suitably form the inner leading-end protective layer 22 having a high porosity of 40% to 80%. Known technology is applicable to thermal spraying and firing.

Upon formation of the inner leading-end protective layer 22, powder (alumina powder) for forming the outer leading-end protective layer similarly prepared in advance and containing alumina powder having predetermined particle size distribution is thermal sprayed at a position of the element base 1 as a target of formation of the outer leading-end protective layer 23 to have an intended thickness (step S9) to thereby form the outer leading-end protective layer 23 having a desired porosity. The alumina powder for forming the outer leading-end protective layer does not contain the pore-forming material. Known technology is also applicable to the thermal spraying.

The inner leading-end protective layer 22 and/or the outer leading-end protective layer 23 may be polished after formation thereof to increase uniformity of the thickness of the leading-end protective layer 2. A polishing method is not particularly limited. When abrasive paper (sandpaper) is used, the paper having a grit size number of 150 or less is preferably used.

The sensor element 10 is obtained by the above-mentioned procedures. The sensor element 10 thus obtained is housed in a predetermined housing, and built into the body (not illustrated) of the gas sensor 100.

<Modifications>

The above-mentioned embodiment is targeted at a sensor element having three internal chambers, but the sensor element is not necessarily required to have a three-chamber structure. That is to say, the sensor element may have one internal chamber or two internal chambers.

In the above-mentioned embodiment, after thermal spraying of the powder for forming the inner leading-end protective layer in step S7, firing in step S8 is performed, and then thermal spraying of the powder for forming the outer leading-end protective layer in step S9 is performed, but firing in step S8 and thermal spraying in step S9 may be performed in reverse order.

In the above-mentioned embodiment, the inner leading-end protective layer 22 and the outer leading-end protective layer 23 are each made of alumina, and the alumina powder is used as a thermal spraying material when these layers are formed, but the inner leading-end protective layer 22 and the outer leading-end protective layer 23 may not be made of alumina. The inner leading-end protective layer 22 and the outer leading-end protective layer 23 may be provided using a metal oxide, such as zirconia ($ZrO_2$), spinel ($MgAl_2O_4$), and mullite ($Al_6O_{13}Si_2$), in place of alumina. In this case, powder of these metal oxides may be used as the thermal spraying material.

EXAMPLES

Twelve types of gas sensors 100 (Samples Nos. 1 to 12) having different total thicknesses of the leading-end protective layer 2 of the sensor element 10 were manufactured.

Evaluation of water resistance (a water resistance test) was conducted on each of the gas sensors 100. The water resistance test was conducted using a test apparatus imitating an actual vehicle in accordance with the method disclosed in Japanese Patent No. 5997833.

Specifically, as the test apparatus, an assembly in which two pipes were connected to each other to form an angle of 150°, a blower was connected to one of the pipes via a switching valve, and the gas sensor was disposed along the other one of the pipes was prepared. 100 mL of water was stored in a joint portion of the pipes, and, after the heater 150 performed heating in an air atmosphere to stabilize the temperature of the sensor element 10 at 850° C., the blower blew air to the pipe to which the gas sensor 100 had been attached at an air speed of approximately 50 m/s for three seconds to splash water toward the gas sensor 100. Whether cracking of the sensor element 10 occurred after air blowing was checked. More particularly, air blowing to the pipe to which the gas sensor 100 had been attached was performed by switching a flow of air at an air speed of approximately 50 m/s through a bypass with the switching valve being connected prepared in advance to the pipe to which the gas sensor 100 had been attached through operation of the switching valve, by a method similar to the method of Japanese Patent No. 5997833.

Though it is not necessarily easy to specifically specify the portion of the leading-end protective layer 2 locally having a small total thickness, water-induced cracking occurring in anywhere of the leading-end protective layer 2 can be detected by the method if it occurs, so that a relationship between a degree of variation in thickness of the leading-end protective layer 2 and water-induced cracking can be specified.

As a method for evaluating water resistance, a method of intermittently applying an equal quantity of water droplets at a time to the leading-end protective layer 2 and using a maximum amount of water not causing water-induced cracking as an indicator of water resistance is known, but this method is not necessarily appropriate as a method for checking effects of the present invention because, even if many positions are determined as positions where water droplets are applied, water resistance of the portion of the leading-end protective layer 2 locally having a small thickness cannot necessarily be evaluated.

Total thicknesses of the leading-end protective layer 2 at the Pos. 1, Pos. 2, and Pos. 3 on the side of the heater surface of each of the sensor elements 10 were obtained from a cross-sectional SEM image, and the total thickness representative value, the maximum film thickness difference, and the film thickness variation degree were calculated using the obtained values.

Total thicknesses of the leading-end protective layer 2 at the Pos. 1, Pos. 2, and Pos. 3 (shown as "PROTECTIVE LAYER TOTAL FILM THICKNESS" in Table 1), the total thickness representative value (shown as "Ave." in Table 1) and the maximum film thickness difference thereof, the film thickness variation degree calculated from these values, and results of evaluation of water resistance of each of the gas sensors 100 are shown in Table 1 as a list.

TABLE 1

| No. | PROTECTIVE LAYER TOTAL FILM THICKNESS [μm] | | | | MAXIMUM FILM THICKNESS DIFFERENCE (Max − Min) [μm] | FILM THICKNESS VARIATION DEGREE | WATER RESISTANCE |
|---|---|---|---|---|---|---|---|
| | Pos. 1 | Pos. 2 | Pos. 3 | Ave. | | | |
| 1 | 332.2 | 353.3 | 322.2 | 335.9 | 31.1 | 9.3 | ○ |
| 2 | 718.2 | 763.1 | 748.1 | 743.1 | 44.9 | 6.0 | ○ |
| 3 | 442.1 | 442.1 | 268.4 | 384.2 | 173.7 | 45.2 | × |
| 4 | 932.5 | 1030.7 | 687.1 | 883.4 | 343.6 | 38.9 | × |
| 5 | 245.6 | 230.8 | 253.4 | 243.3 | 22.6 | 9.3 | × |
| 6 | 680.2 | 764.5 | 676.4 | 707.0 | 88.1 | 12.5 | ○ |

TABLE 1-continued

| | PROTECTIVE LAYER TOTAL FILM THICKNESS [μm] | | | | MAXIMUM FILM THICKNESS DIFFERENCE | FILM THICKNESS VARIATION | WATER |
|---|---|---|---|---|---|---|---|
| No. | Pos. 1 | Pos. 2 | Pos. 3 | Ave. | (Max − Min) [μm] | DEGREE | RESISTANCE |
| 7 | 492.4 | 543.6 | 503.2 | 513.1 | 51.2 | 10.0 | ○ |
| 8 | 403.4 | 467.2 | 412.1 | 427.6 | 63.8 | 14.9 | ○ |
| 9 | 338.5 | 395.3 | 334.8 | 356.2 | 60.5 | 17.0 | ○ |

In Table 1, a circle is marked in a "WATER RESISTANCE" column for a sample in which cracking has not occurred at the end of the water resistance test as it has excellent water resistance, and a cross is marked in the "WATER RESISTANCE" column for a sample in which cracking has occurred.

As shown in Table 1, cracking has not occurred and water resistance is excellent in any of the samples other than Samples Nos. 3 and 4 in which the film thickness variation degree is more than 20 and Sample No. 5 in which the total thickness representative value is less than 250 μm.

The results show that, when the leading-end protective layer 2 is provided so that the total thickness representative value is 250 μm or more and the film thickness variation degree is 20 or less, the occurrence of water-induced cracking of the sensor element 10 due to the presence of the portion locally having a small thickness is suppressed to thereby suitably secure water resistance of the sensor element 10.

What is claimed is:
1. A sensor element of a gas sensor, the sensor element comprising:
   an element base being a ceramic structure having a gas inlet in one end portion thereof into which a measurement gas containing a gas component to be measured is introduced and including therein a gas distribution part communicating from said gas inlet in a longitudinal direction, and a sensing part for sensing said gas component to be measured disposed in said gas distribution part; and
   a leading-end protective layer being a porous layer disposed around an outer periphery of said element base in a predetermined range from said one end portion, wherein said leading-end protective layer includes:
   an inner leading-end protective layer disposed to cover said end portion and four side surfaces of said element base contiguous with said end portion; and
   an outer leading-end protective layer disposed to cover said inner leading-end protective layer, and having a lower porosity than said inner leading-end protective layer,
said sensor element further includes an underlying layer provided between said inner leading-end protective layer and said element base, having a porosity of 30% to 60% and a thickness of 15 μm to 50 μm, and
a total thickness representative value is 250 μm or more, and a film thickness variation degree is 20 or less,
where said total thickness representative value is defined as an average value of total thicknesses of said leading-end protective layer at a plurality of thickness evaluation positions, said plurality of thickness evaluation positions including at least:
   a first position as a position of a starting point of said gas distribution part where said gas inlet is disposed;
   a second position as an intermediate position of said gas distribution part; and
   a third position as a position of an innermost end of said gas distribution part from said gas inlet, and
said film thickness variation degree is defined as a ratio of a difference between a maximum value and a minimum value of said total thicknesses of said leading-end protective layer at said plurality of thickness evaluation positions with respect to said total thickness representative value that is multiplied by 100.
2. The sensor element according to claim 1, wherein
said inner leading-end protective layer has a porosity of 40% to 80%, and
said outer leading-end protective layer has a porosity of 10% to 40%.

* * * * *